United States Patent
Deng et al.

(10) Patent No.: US 10,672,571 B2
(45) Date of Patent: Jun. 2, 2020

(54) DIAL WHEEL MECHANISM AND CONTROL DEVICE

(71) Applicant: SZ DJI TECHNOLOGY CO., LTD., Shenzhen (CN)

(72) Inventors: Lei Deng, Shenzhen (CN); Zhenkai Wu, Shenzhen (CN); Bo Yuan, Shenzhen (CN); Yin Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 61 days.

(21) Appl. No.: 16/102,880

(22) Filed: Aug. 14, 2018

(65) Prior Publication Data
US 2018/0358195 A1  Dec. 13, 2018

Related U.S. Application Data

(63) Continuation of application No. PCT/CN2016/100211, filed on Sep. 26, 2016.

(51) Int. Cl.
*H01H 19/14* (2006.01)
*F16H 35/18* (2006.01)
(Continued)

(52) U.S. Cl.
CPC .............. *H01H 19/14* (2013.01); *F16H 35/18* (2013.01); *G05G 5/02* (2013.01); *G05G 5/06* (2013.01);
(Continued)

(58) Field of Classification Search
CPC .. H01H 19/14; H01H 19/11; H01H 2025/043; F16H 35/18; G05G 5/02; G05G 5/06; G05G 1/10
(Continued)

(56) References Cited

U.S. PATENT DOCUMENTS 5,785,317 A * 7/1998 Sasaki ..................... A63F 13/06
                                                              273/148 B
6,058,296 A   5/2000 Lian et al.
(Continued)

FOREIGN PATENT DOCUMENTS

CN       101223618 A    7/2008
CN       101308738 A    11/2008
(Continued)

OTHER PUBLICATIONS

The World Intellectual Property Organization (WIPO) International Search Report for PCT/CN2016/100211 dated Jun. 29, 2017 6 pages.

*Primary Examiner* — Edwin A. Leon
(74) *Attorney, Agent, or Firm* — Anova Law Group, PLLC

(57) ABSTRACT

A remote controller includes a main body of control device, a dial wheel mechanism arranged at the main body of control device, and a controller configured to obtain rotation angle information of the dial wheel mechanism and control movement of an external device according to the rotation angle information. The dial wheel mechanism includes a support, a positioning member disposed at the support, and a rotating member rotatably disposed at the support. The positioning member includes a positioning element and at least one elastic arm disposed at the positioning element. The rotating member is configured to rotate relative to the support, causing the at least one elastic arm to abut against the support and to be elastically deformed. The rotating member includes multiple positioning slots to engage with the positioning element, which is configured to selectively engage with one of the positioning slots.

20 Claims, 4 Drawing Sheets

(51) Int. Cl.
    *G05G 5/02* (2006.01)
    *H01H 19/11* (2006.01)
    *G05G 5/06* (2006.01)
    *H01H 19/62* (2006.01)
    *G05G 1/10* (2006.01)

(52) U.S. Cl.
    CPC ............ *H01H 19/11* (2013.01); *H01H 19/62* (2013.01); *G05G 1/10* (2013.01)

(58) Field of Classification Search
    USPC .................. 200/11 R, 50.33, 336; 273/148 B
    See application file for complete search history.

(56) References Cited

U.S. PATENT DOCUMENTS

| | | | |
|---|---|---|---|
| 7,893,369 B2 * | 2/2011 | Wang ..................... | H01H 19/22 200/11 R |
| 8,067,709 B2 * | 11/2011 | Han ....................... | B62D 1/046 200/336 |
| 2016/0102475 A1 | 4/2016 | Kuo et al. | |

FOREIGN PATENT DOCUMENTS

| | | |
|---|---|---|
| CN | 203653537 U | 6/2014 |
| CN | 104011615 A | 8/2014 |
| CN | 206076131 U | 4/2017 |
| JP | H0843550 A | 2/1996 |

\* cited by examiner

DIAL WHEEL MECHANISM AND CONTROL DEVICE

CROSS-REFERENCE TO RELATED APPLICATION

This application is a continuation application of International Application No. PCT/CN2016/100211, filed on Sep. 26, 2016, the entire contents of which are incorporated herein by reference.

TECHNICAL FIELD

This disclosure relates to a dial wheel mechanism and a control device using the dial wheel mechanism.

BACKGROUND

For a conventional control device with a dial wheel mechanism, external forces are used to rotate the dial wheel to a desired gear position, and information of the gear position is input to a controller of the control device, thereby realizing control of an external device. This kind of dial wheel mechanism generally uses a spring plunger structure to engage with or separate from the dial wheel to change gear position. However, specific mounting structures and components are needed to install the spring plunger structure, which makes the overall volume of the dial wheel mechanism relatively large, and the structure and assembling process of the dial wheel mechanism complicated.

SUMMARY

In accordance with the disclosure, there is provided a remote controller, including a main body of control device, a dial wheel mechanism, and a controller. The dial wheel mechanism is arranged at the main body of control device and includes a support, a positioning member, and a rotating member. The positioning member is disposed at the support and includes a positioning element and at least one elastic arm disposed at the positioning element. The rotating member is rotatably disposed at the support and configured to rotate relative to the support, causing the at least one elastic arm to abut against the support and to be elastically deformed. The rotating member includes multiple positioning slots to engage with the positioning element. The positioning element is configured to selectively engage with one of the positioning slots. The controller is configured to obtain rotation angle information of the dial wheel mechanism and control movement of an external device according to the rotation angle information.

Figure 1:
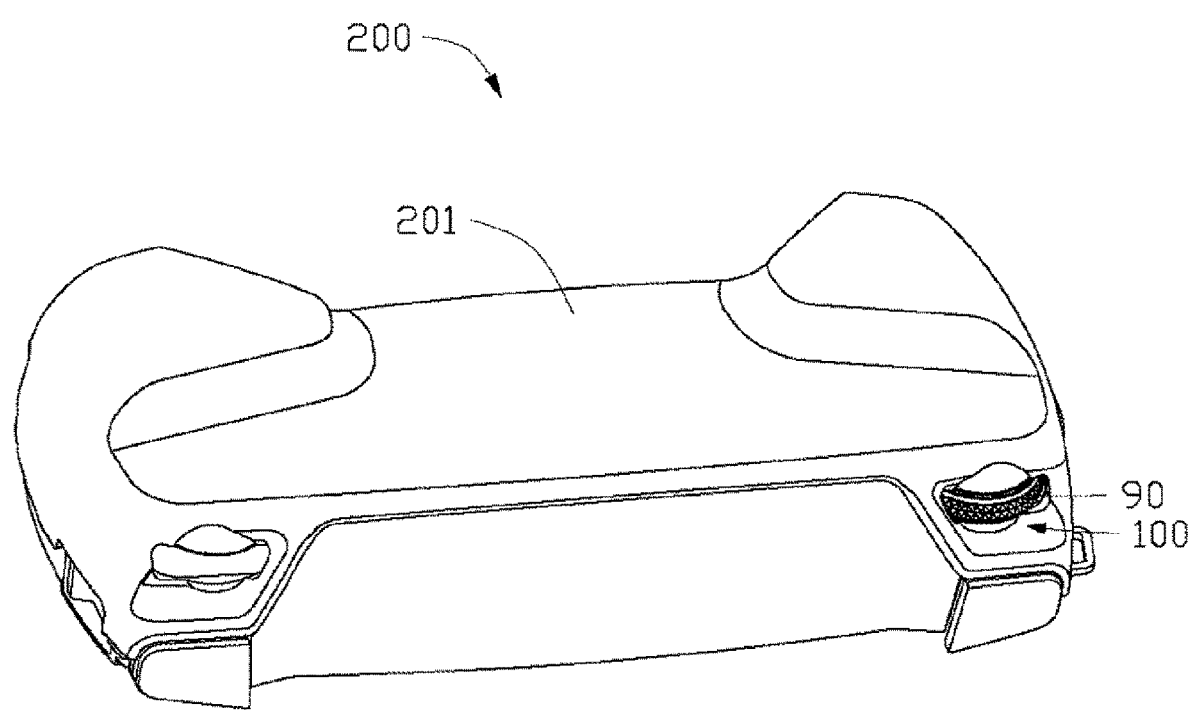
FIG. 1 is a schematic perspective view of a control device according to an embodiment of the present disclosure.

| Reference Numerals for Main Components | |
|---|---|
| Control device | 200 |
| Main body of control device | 201 |
| Dial wheel mechanism | 100 |
| Support | 10 |
| Base | 12 |
| Mounting member | 14 |
| Stopper | 141 |
| Guide Surface | 1411 |
| Mounting element | 143 |
| Accommodating groove | 1431 |
| Opening | 1433 |
| Abutment | 145 |
| Positioning member | 30 |
| Positioning element | 32 |
| Elastic arm | 34 |
| Abutment section | 341 |
| Deformation section | 343 |
| Rotating member | 50 |
| Connecting element | 52 |
| Sleeve element | 53 |
| Perimeter wall | 54 |
| Positioning slot | 541 |
| Fitting element | 543 |
| Output axle | 56 |
| Operation member | 90 |
| Matching element | 92 |
| Anti-skid element | 94 |

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

A dial wheel mechanism includes a support, and a positioning member and a rotating member disposed at the support. The positioning member includes a positioning element, and an elastic arm disposed at the positioning element. The rotating member is rotatably disposed at the support, and the rotating member includes multiple positioning slots that can be engaged with the positioning element. The rotating member can be rotated by an external force relative to the support, causing the elastic arm to abut against the support and to be elastically deformed. The positioning element may selectively engage with one of the positioning slots. Another aspect of the disclosure also provides a control device using the dial wheel mechanism.

A control device includes a main body of control device and a controller disposed at the main body of control device. The control device includes the dial wheel mechanism arranged at the main body of control device to allow the controller to obtain rotation angle information of the dial wheel mechanism. According to the rotation angle information, the controller may control the movement of an external device. The dial wheel mechanism includes a support, and a positioning member and a rotating member disposed at the support. The positioning member includes a positioning element and an elastic arm disposed at the positioning element. The rotating member may be rotatably disposed at the support, and the rotating member includes multiple positioning slots that can be engaged with the positioning element. The rotating member can be rotated by an external force relative to the support, causing the elastic arm to abut against the support and to be elastically deformed. The positioning element may selectively engage with one of the positioning slots.

The embodiments of the present disclosure will be described in detail below with reference to the accompanying drawings. In the case of no conflict, the following embodiments and their features can be combined with each other.

Figure 2:
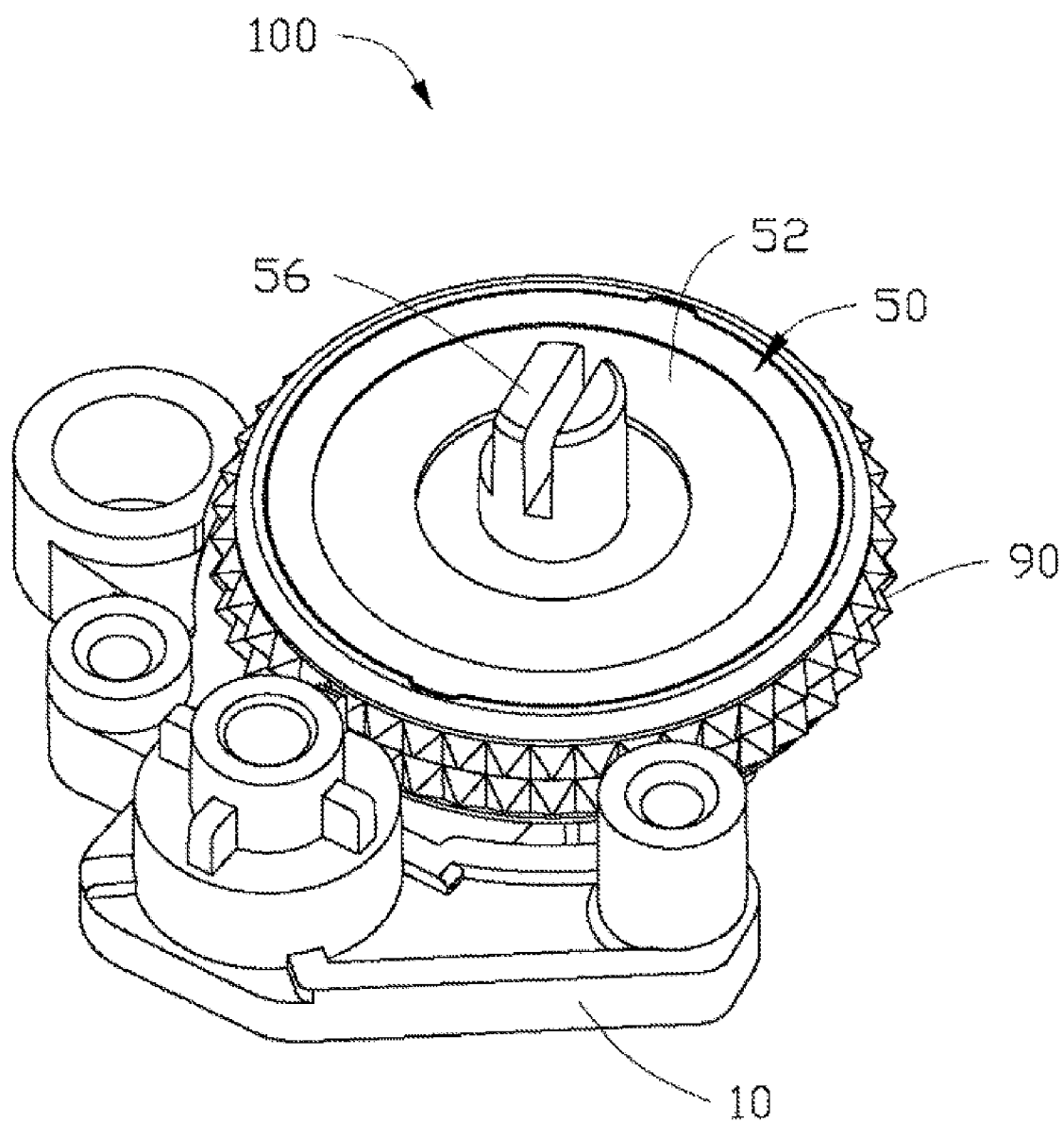
FIG. 2 is a schematic perspective view of a dial wheel mechanism of the control device shown in FIG. 1.

FIG. 1 and FIG. 2 schematically show a dial wheel mechanism 100, which is applied to a control device 200. An operation member 90 can be rotated by an external force to a desired gear position. The gear position information of the operation member 90 can be input to a controller (not shown) of the control device 200 to realize a control function for controlling the external device.

Further, the control device 200 may be a remote controller, which includes a main body of control device 201, a sensor (not shown), and the controller (not shown) disposed at the main body of control device 201. The dial wheel mechanism 100 is disposed at the main body of control device 201. The sensor is configured to obtain the gear position information of the operation member 90 of the dial wheel mechanism 100 and send the gear position information to the controller. The controller can generate a control signal based on the gear position information and control the movement of an external device.

Figure 3:
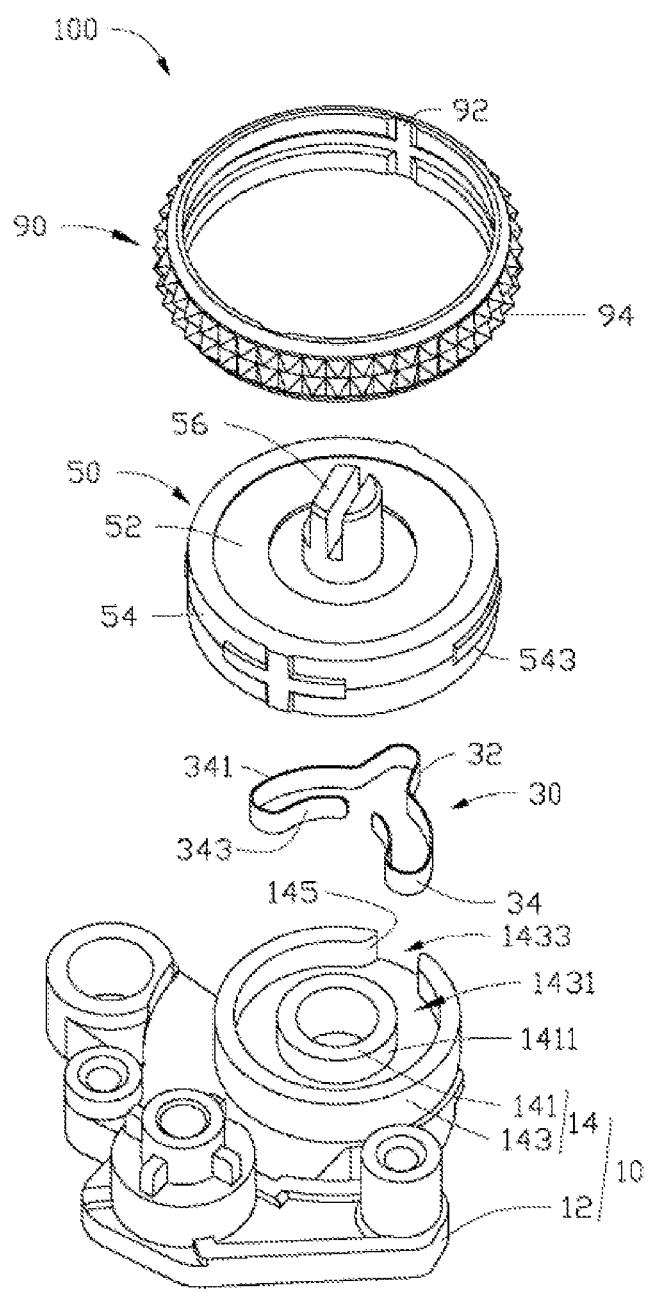
FIG. 3 is an exploded perspective view of the dial wheel mechanism shown in FIG. 2.

Refer to FIG. 3, the dial wheel mechanism 100 includes a support 10, a positioning member 30, a rotating member 50, and the operation member 90. In the illustrated embodiment, the support 10 is disposed at the main body of control device 201; both the positioning member 30 and the rotating member 50 are disposed at the support 10; and the operation member 90 is disposed at the rotating member 50. Rotation of the operation member 90 can cause the rotating member 50 to rotate relative to the positioning member 30 and the support 10 and cause the positioning member 30 to engage with or separate from the rotating member 50, so that the operation member 90 may be rotated to and stabilized at a desired gear position.

The support 10, which is fixed at, e.g., in, the main body of control device 201, is configured to mount the positioning member 30 and the rotating member 50. In some embodiments, as shown in FIG. 3, the support 10 includes a base 12 and the mounting member 14 disposed at the base 12.

The base 12 may be detachably coupled to the main body of control device 201.

The mounting member 14 includes a stopper 141 and a mounting element 143. The stopper 141 is disposed on the base 12 and is configured to connect with the rotating member 50. In some embodiments, the stopper 141 is approximately in a shape of a hollow cylinder, and a perimeter wall of the stopper 141 forms a guide surface 1411. The guide surface 1411 is configured to cooperate with the positioning member 30 and guide the movement direction of the positioning member 30.

In some embodiments, the mounting element 143 is substantially annular and is disposed at the outer periphery of the stopper 141. In some embodiments, the mounting element 143 is disposed around the stopper 141 without direct contacting the stopper 141. A space between the mounting element 143 and the stopper 141 forms an accommodating groove 1431, which is configured to accommodate a part of the structure of the positioning member 30. Further, an opening 1433 is disposed at the mounting element 143, and the opening 1433 can communicate with the accommodating groove 1431. The opening 1433 is configured to accommodate a part of the structure of the positioning member 30, so that the positioning member 30 can protrude out of the mounting member 14 from the accommodating groove 1431 through the opening 1433, to engage with or separate from the rotating member 50. The mounting element 143 includes an abutment 145 at each side of the opening 1433. The abutments 145 are configured to abut against the positioning member 30. With the action of an external force, the positioning member 30 can abut against the abutment 145 and be elastically deformed, so as to be engaged with or separated from the rotating member 50.

The positioning member 30 is partially accommodated in the accommodating groove 1431 and is movable relative to the mounting member 14. The positioning member 30 includes a positioning element 32 and at least one elastic arm 34 connected to the positioning element 32. The at least one elastic arm 34 are accommodated in the accommodating groove 1431 and abut against the abutment 145. The positioning element 32 can protrude out of the mounting member 14 through the opening 1433 and engage with or separate from the rotating member 50. When the rotating member 50 rotates relative to the mounting member 14 under an external force, the rotating member 50 can push the positioning element 32, causing the at least one elastic arm 34 to abut against the abutments 145 and be elastically deformed, such that the positioning element 32 can engage with or separate from the rotating member 50.

In the example shown in the figures, the positioning member 30 as a whole has a substantially curved sheet shape and includes two elastic arms 34. The positioning element 32 includes a protrusion that is bent substantially in a "∩" shape. The two elastic arms 34 are respectively disposed on two opposite sides of the positioning element 32 symmetrically. Both elastic arms 34 are accommodated in the accommodating groove 1431 and are respectively located on two sides of the opening 1433 so that the positioning element 32 passes through the opening 1433. The two elastic arms 34 abut against the two abutments 145, respectively. When the elastic arms 34 are accommodated in the accommodating groove 1431, the elastic arms 34 can slide relative to the mounting member 14 along extending directions of the accommodating groove 1431. In some embodiments, the elastic arms 34 are movably abutted against the guide surface 1411. When the positioning member 30 is elastically deformed, the elastic arms 34 can slide along the guide surface 1411 with the support of the abutments 145.

In some embodiments, each of the elastic arms 34 includes an abutment section 341 and a deformation section 343. The abutment section 341 is connected to the positioning element 32 and is bent relative to the positioning element 32 and extends in a direction facing away from the positioning element 32.

A connecting point between the abutment section 341 and the positioning element 34 abuts against an abutment 145. The deformation section 343 is disposed at an end of the abutment section 341 that is distal to the positioning element 32 and is bent and extended from the abutment section 341.

In some embodiments, the deformation section 343 is bent at 180 degrees with respect to the abutment section 341, and extends toward the positioning element 32, such that an end of the deformation section 343 is parallel to the abutment section 341. The deformation section 343 slidably abut against the guide surface 1411. When the positioning member 30 is elastically deformed, the deformation section 343 slides along the guide surface 1411. In some embodiments, the ends of the deformation sections 343 of the two elastic arms 34 are separated from each other so that the entire positioning member 30 can be elastically deformed for a greater amount. In some embodiments, the ends of the deformation sections 343 of the two elastic arms 34 may be connected to each other so that the whole positioning member 30 includes a bent loop-shaped elastic piece. The disclosure is not limited thereto. In some embodiments, the two elastic arms 34 may include an integral structure formed by bending a metal sheet.

Figure 4:
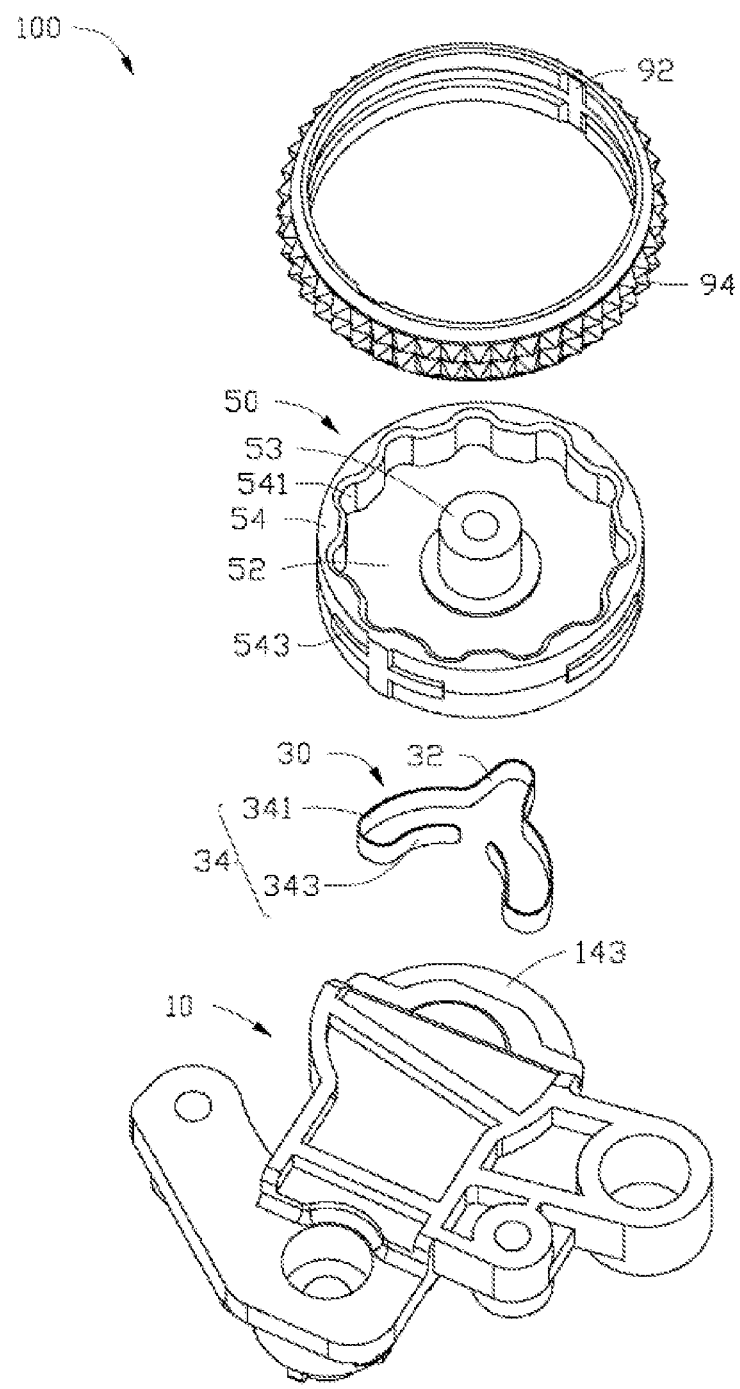
FIG. 4 is an exploded perspective view of the dial wheel mechanism shown in FIG. 2 from another perspective.

As shown in FIG. 4, the rotating member 50 is rotatably disposed on the mounting member 14 of the support 10 and is engaged with the positioning member 30. In the illustrated embodiment, the rotating member 50 includes a connecting element 52 and a perimeter wall 54. The connecting element 52 is rotatably connected to the stopper 141. The perimeter wall 54 is disposed at the connecting element 52 and buckled outside the mounting element 143.

In some embodiments, the connecting element 52 has a substantially circular plate shape. A sleeve element 53 is provided at an approximately central position of the connecting element 52. The sleeve element 53 is approximately cylindrical and protrudes into the stopper 141 and can rotate relative to the stopper 141.

In some embodiments, the perimeter wall 54 is approximately annular and disposed at the connecting element 52 and surrounds a peripheral edge of the connecting element 52. When the sleeve element 53 is connected to the stopper 141, the perimeter wall 54 surrounds the periphery of the mounting element 14.

Multiple positioning slots 541 are provided on an inside of the perimeter wall 54 for engaging with the positioning element 32 so that the rotating member 50 can be positioned at a gear position needed by the dial wheel mechanism 100. In some embodiments, there are multiple positioning slots 541 arranged evenly spaced along a circumferential direction of the perimeter wall 54. By engaging different positioning slots 541 with the positioning element 32, the rotating member 50 can be positioned at the desired gear position.

Further, a contour of the positioning slot 541 matches that of the positioning element 32 so that when the rotating member 50 rotates clockwise or counterclockwise, the positioning slot 541 can push against the positioning element 32, causing the at least one elastic arm 34 to abut against the abutments 145 and be elastically deformed. This can effectively eliminate or decrease virtual movement of the rotating member 50 while it is changing the rotation direction. Therefore, controlling accuracy of the dial wheel mechanism 100 is increased and the user experience is improved.

A fitting element 543 is provided at an outside of the perimeter wall 54. The fitting element 543 is configured to connect with the operation member 90, so that the operation member 90 can rotate under an external force to drive the rotating member 50 to rotate. In the illustrated embodiments, the fitting element 543 includes a cross-shaped groove that can be fitted with the operation member 90.

Further, the rotating member 50 also includes an output shaft 56 (as shown in FIG. 3). The output shaft 56 is disposed on a side of the connecting element 52 facing away from the sleeve element 53. The output shaft 56 is connected to the sensor of the control device 200 and is configured to output rotation angle information of the rotating member 50 to allow the sensor of the control device 200 to sense the rotation position information of the operation member 90 of the dial wheel mechanism 100. The position information can be transmitted to the controller. The controller can generate a control signal according to the position information and control the external device to move. The sensor may be a potentiometer.

The operation member 90 is sleeved outside the peripheral wall 54 of the rotating member 50 to allow the user to dial the operation member 90 to rotate the rotating member 50. In some embodiments, the operation member 90 is approximately annular. A matching element 92 is disposed on an inner wall of the operation member 90. The matching element 92 and the fitting element 543 may engage with each other so that the operation member 90 can be detachably disposed on the rotating member 50. In the illustrated embodiments, the matching element 92 includes a cross-shaped groove adapted to the cross-shaped protrusion of the fitting element 543. In some other embodiments, the fitting element 543 may include a cross-shaped groove, and the matching element 92 may include a cross-shaped protrusion. In some other embodiments, the fitting element 543 and the matching element 92 may include other matching structures. The present disclosure is not limited thereto.

As shown in FIG. 3 and FIG. 4, the operation member 90 further includes an anti-skid element 94 disposed at an outside surface of the operation member 90. The anti-skid element 94 can increase a friction force when the user dials the operation member 90.

In the control device 200 and the dial wheel mechanism 100 consistent with the present disclosure, the rotating member 50 is disposed on the support 10. Further, because the positioning member 30 includes the positioning element 32 and the at least one elastic arm 34, the positioning member 30 can be directly accommodated between the rotating member 50 and the support 10. As such, an internal space of the dial wheel mechanism 100 is reasonably used. Moreover, this structure arrangement does not need specific mounting fitting structure or parts. Therefore, the dial wheel mechanism 100 has a relatively small overall volume and simple structure and can be more easily assembled.

In the present embodiment, the dial wheel mechanism 100 is applied to the control device 200. The control device 200 is a remote controller for electrically connecting with an external device and remotely controlling the external device. The control device 200 may also be a controller other than a remote controller. For example, the control device 200 may be a wired controller for controlling an external device, a game controller or the like, or a gear position controller.

It is intended that the specification and embodiments be considered as examples only and not to limit the scope of the disclosure. Any modification and equivalently replacement for the technical solution of the present disclosure should all fall in the spirit and scope of the technical solution of the present disclosure.

What is claimed is:

1. A remote controller comprising:
a main body of a control device;
a dial wheel mechanism arranged at the main body of the control device and including:
a support;
a positioning member disposed at the support and including:
a positioning element; and
at least one elastic arm disposed at the positioning element; and
a rotating member rotatably disposed at the support and configured to rotate relative to the support, causing the at least one elastic arm to abut against the support and to be elastically deformed, the rotating member including multiple positioning slots to engage with the positioning element; and the positioning element being configured to selectively engage with one of the positioning slots; and
a controller configured to obtain rotation angle information of the dial wheel mechanism and control movement of an external device according to the rotation angle information.

2. The remote controller according to claim 1, wherein: the at least one elastic arm includes two elastic arms respectively disposed at two opposite sides of the positioning element symmetrically.

3. The remote controller according to claim 2, wherein the two elastic arms abut against the support.

4. The remote controller according to claim 2, wherein each of the two elastic arms includes a curved elastic sheet.

5. The remote controller according to claim 4, wherein each of the two elastic arms includes:
an abutment section connected to the positioning element and bending relative to the positioning element; and
a deformation section bending and extending from the abutment section.

6. The remote controller according to claim 5, wherein a connecting point between the abutment section and the positioning element abuts against the support.

7. The remote controller according to claim 5, wherein: the deformation section is bent at 180 degrees with respect to the abutment section; and
an end of the deformation section is parallel to the abutment section.

8. The remote controller of claim 5, wherein:
the abutment section extends in a direction facing away from the positioning element; and
the deformation section is connected to an end of the abutment section distal to the positioning element, and bends with respect to and extends from the abutment section toward the positioning element.

9. The remote controller of claim 8, wherein the ends of the deformation sections of the two elastic arms are separated from each other.

10. The remote controller of claim 8, wherein the ends of the deformation sections of the two elastic arms are connected to each other.

11. The remote controller of claim 5, wherein the deformation section slidably abuts a guide surface of the support, and slides with respect to the guide surface in response to the positioning member being elastically deformed.

12. The remote controller of claim 2, wherein each of the two elastic arms includes an integral structure formed by bending a metal sheet.

13. The remote controller according to claim 1, wherein:
the support includes an accommodating groove; and
the elastic arm of the positioning member is movably disposed at the accommodating groove and configured to slide in an extending direction of the accommodating groove in response to the positioning member being deformed.

14. The remote controller according to claim 13, wherein:
the support includes a stopper and a mounting element disposed around an outer periphery of the stopper without direct contact; and
a space between the mounting element and the stopper forms the accommodating groove.

15. The remote controller of claim 14, wherein:
the stopper includes a guide surface; and
the elastic arm is slidably abutted against the guide surface of the support and configured to slide relative to the guide surface in response to the positioning member being deformed elastically.

16. The remote controller according to claim 14, wherein:
the mounting element includes an opening; and
the positioning element protrudes from the opening and engages with one of the positioning slots.

17. The remote controller according to claim 16, wherein:
the mounting element comprises abutments at two sides of the opening; and
a connecting point between one of the at least one elastic arm and one of the positioning elements abut against one of the abutments.

18. The remote controller of claim 1, wherein:
the rotating member further includes:
a connecting element rotatably connected to the support; and
a perimeter wall circumferentially disposed on an outer periphery of the connecting element; and
the positioning slots are disposed at the perimeter wall.

19. The remote controller of claim 18, wherein the dial wheel mechanism further includes:
an operation member sleeved outside the perimeter wall and configured to be dialed to rotate the rotating member.

20. The remote controller of claim 1, wherein the dial wheel mechanism further includes:
a sensor; and
an output shaft disposed on the rotating member and connected to the sensor;
wherein the sensor is configured to obtain a rotation angle of the rotating member.

* * * * *